UNITED STATES PATENT OFFICE.

ALBERT L. MUREN, OF BURLINGTON, IOWA.

BATTERY CONSTRUCTION.

1,416,738. Specification of Letters Patent. Patented May 23, 1922.

No Drawing. Application filed January 11, 1919. Serial No. 270,729.

*To all whom it may concern:*

Be it known that I, ALBERT L. MUREN, a citizen of the United States of America, and a resident of Burlington, in the county of Des Moines and State of Iowa, have invented certain new and useful Improvements in Battery Constructions, of which the following is a specification.

The primary object of this invention is to provide an improvement in batteries of the type employing an alkaline electrolyte, in which the active materials thereof during the charge and discharge of the battery will remain undissolved in the electrolyte.

Another object of this invention is to provide an improvement in a battery whereby the heretofore metallic deposits of the battery are eliminated, thereby preventing treeing or bridging between the plates of the battery, and henceforth preventing short circuiting of the cell.

A further object is in providing an improved battery electrolyte.

Other and further objects will appear in the specification and be specifically pointed out in the appended claims.

As related in one of the aforementioned objects of this invention relative to an improved form of battery electrolyte it has been found that if an alkaline tungstate is dissolved in water and is used as an electrolyte, the zinc during discharge will oxidize but will not dissolve in the battery solution, in which case there will be no zinc deposit during the charging of the battery, and henceforth there will be no treeing or bridging between the plates, thereby short circuiting, as is done in other types of batteries.

As an illustration of the zinc deposit formation, any type of battery such as is known as the nickel zinc potassium cell, in which the metallic zinc is opposed to nickel hydroxide in potassium hydrate solution, the zinc on discharge being dissolved in the electrolyte will form an alkaline zincate and the nickel hydroxide will be reduced to a lower condition of oxidation. When a battery or cell of this type is charged, the nickel hydroxide will be oxidized to a higher state of oxidation, and the zinc will be plated out of the solution, thereby forming the zinc deposit which will invariably tree or bridge between the plates and short circuit the cell.

In making up a solution of alkaline tungstate which comprises this invention and discovery, the proportion of alkaline tungstate salts and water can be varied within wide limits, and either of the several forms of tungstate such as potassium, sodium, barium or lithium, known as para salts may be used. However, the best results have been obtained with potassium and sodium tungstate solutions of twelve hundred to thirteen hundred gravity.

It will of course be understood that this improved form of electrolyte may be used in any alkaline battery, either primary or secondary, and that any suitable active depolarizing material may be employed, such as the oxides of copper, silver cadmium or mercury, or the hydroxides of nickel or cobalt.

In making a solution to the aforementioned alkaline tungstates, preference is given to the use of potassium or sodium, as the best results are obtained thereby in forming this improved electrolyte. Very good results, however, may be secured with a mixture of several of the alkaline tungstate or by the addition of sodium or potassium hydrate with an alkaline tungstate.

It has been found that a battery using an alkaline tungstate solution as called for in this improved invention does not require to be sealed to exclude the air in order to prevent the electrolyte changing its composition, and in addition has the further advantage of a higher terminal E. M. F. and is sufficiently hydroscopic to remain in the solution, and does not crystallize at the jar tops as do most alkaline solutions.

What I claim is:—

1. An alkaline battery electrolyte containing an alkaline tungstate.

2. A battery electrolyte containing alkaline tungstates.

3. In the construction of a reversible battery containing an alkaline solution, the employment of an electrolyte comprising a mixture of alkaline tungstates.

ALBERT L. MUREN.